United States Patent
Saravanos et al.

(12)
(10) Patent No.: US 6,865,332 B1
(45) Date of Patent: Mar. 8, 2005

(54) FIBER OPTIC SPLITTER PACKAGE AND METHOD OF MANUFACTURE

(75) Inventors: Costas Saravanos, Highland Village, TX (US); Elli Makrides-Saravanos, Highland Village, TX (US); Yan Hua, Ft. Worth, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 10/743,167

(22) Filed: Dec. 22, 2003

(51) Int. Cl.[7] .............................................. G02B 6/00
(52) U.S. Cl. ...................................... 385/136; 385/137
(58) Field of Search ................................ 385/136, 137, 385/129, 130, 132

(56) References Cited

U.S. PATENT DOCUMENTS 4,252,407 A * 2/1981 Bubanko et al. ............... 385/59
5,930,438 A * 7/1999 Palmskog et al. ........... 385/129

* cited by examiner

Primary Examiner—Chandrika Prasad

(57) ABSTRACT

A fiber optic splitter package and method are provided for protecting a fiber optic splitter assembly while preventing adverse affects from temperature cycling. The fiber optic splitter package includes a housing, a fiber optic splitter assembly, and a flexible retainer member that holds the fiber optic splitter assembly in the housing. The flexible retainer member has a modulus of about 30 to about 80 on a Shore A hardness scale, thereby insulating the fiber optic splitter assembly from stress due to differences in the coefficients of thermal expansion of the housing and the fiber optic splitter assembly.

18 Claims, 4 Drawing Sheets

FIBER OPTIC SPLITTER PACKAGE AND METHOD OF MANUFACTURE

FIELD OF THE INVENTION

The present invention relates to a fiber optic splitter package, and more particularly, a fiber optic splitter package that provides a solution for protecting a fiber optic splitter while preventing adverse affects from stress acting on the splitter, for example, due to temperature cycling, a method of manufacturing the same, and a fixture for assembling the same.

BACKGROUND OF THE INVENTION

There are prior art methods and apparatus for protecting a fiber optic splitter, but the fiber optic splitters are adhered to an outer housing. When those fiber optic splitters are exposed to temperature cycling, the variations in coefficients of thermal expansion may cause insertion losses in the assembly. In order to avoid such insertion losses, an S-bend is typically included in the optical fibers at each end of the splitter. However, inserting the S-bends into the optical fibers is time consuming, difficult, and may require additional equipment. Thus, such a configuration is expensive. Additionally, the adhesives that are used to adhere the fiber optic splitters to the housing tend to degrade over time, causing further degradation of the performance of the fiber optic splitter.

Accordingly, the present invention is directed to a fiber optic splitter package that substantially eliminates one or more of the problems and disadvantages in the prior art. Additional features and advantages of the present invention will be set forth in the description that follows, and in part will be apparent from the description, or may be learned by practice of the invention. The objectives and other advantages of the present invention will be realized and attained by the apparatus and process particularly pointed out in the written description and claims, as well as the appended drawings.

SUMMARY OF THE INVENTION

To achieve these and other advantages and in accordance with the purpose of the invention as embodied and broadly described herein, the invention is directed to a fiber optic splitter package that has a housing, a fiber splitter assembly disposed within the housing, and a flexible retainer member retaining the fiber splitter assembly within the housing.

In another aspect, the invention provides for a method for retaining a fiber splitter assembly within a housing that includes the steps of disposing the housing in a holder, inserting the fiber splitter assembly into the housing; and introducing a flexible retainer member into the housing and around the fiber splitter assembly.

In yet another aspect, the invention is directed to a fiber optic splitter package that includes a fiber splitter assembly inserted into a passageway in a housing; and a resilient retainer member formed around the fiber splitter assembly within the housing.

It is to be understood that the foregoing general description and the following detailed description are merely exemplary and are intended to provide further explanation of the invention as claimed.

The accompanying drawings are included to provide a further understanding of the invention and are incorporated in and constitute a part of the specification. The drawings illustrate several non-limiting embodiments of the present invention and together with the description serve to explain the principles of the invention.

DETAILED DESCRIPTION OF THE INVENTION

Figure 1:
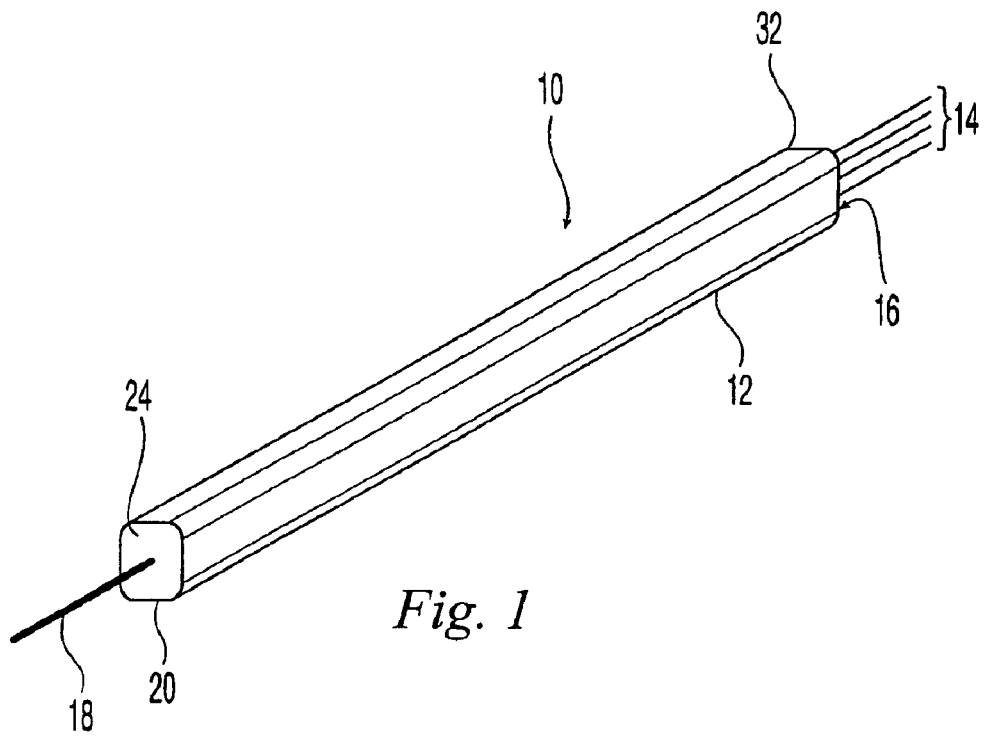
FIG. 1 is a perspective view of a fiber optic splitter package according to one embodiment of the present invention.
Figure 2:
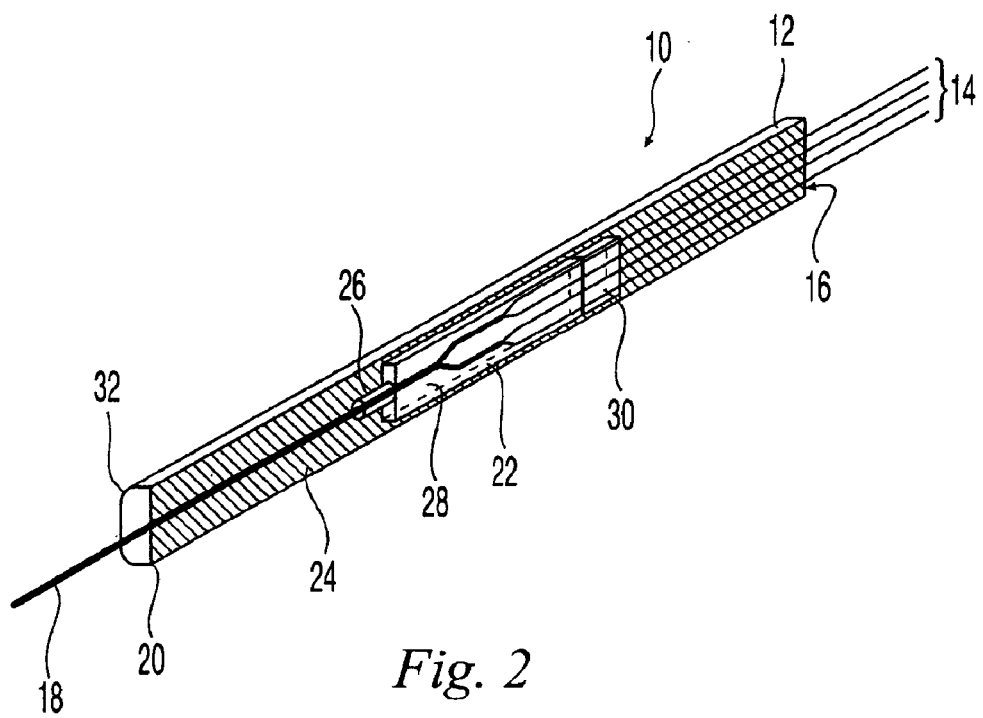
FIG. 2 is a perspective view of a cross section of the fiber optic splitter package of FIG. 1.
Figure 3:
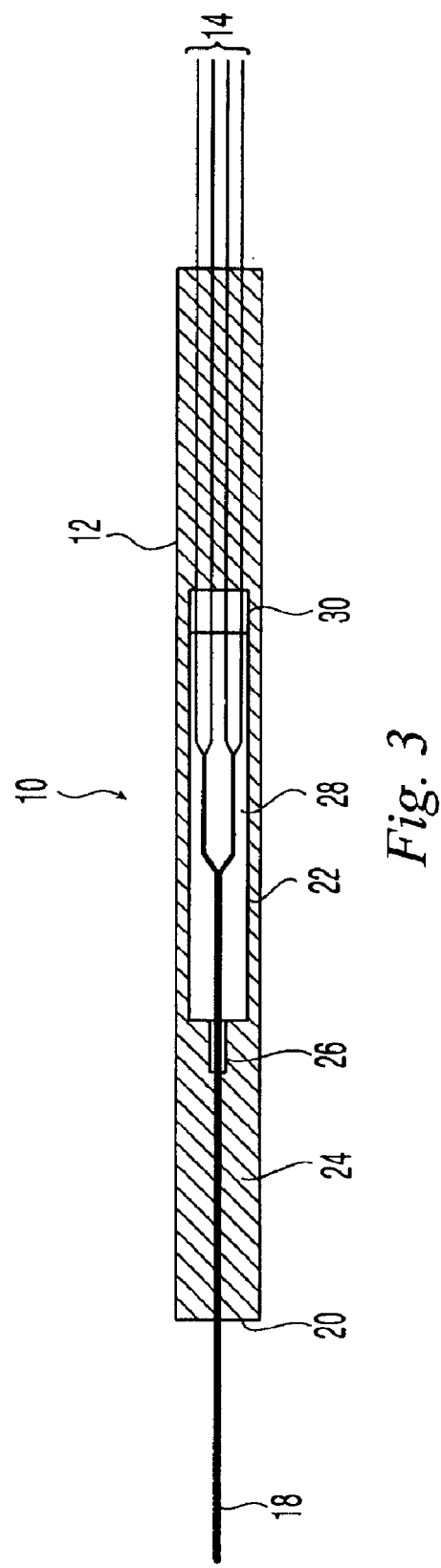
FIG. 3 is a longitudinal cross section of the fiber optic splitter package in FIG. 1

FIG. 1 illustrates one embodiment of a fiber optic splitter package 10 according to the present invention. Preferably, the fiber optic splitter package 10 has a housing 12 with a plurality of optical fibers or a fiber ribbon 14 extending from a first end 16 of the housing 12 and an optical fiber 18 extending from a second end 20 of the housing 12. As best seen in FIGS. 2 and 3, the fiber optic splitter 22 is encased in flexible retainer member 24. The fiber optic splitter 22 can be any fiber optic splitter, but the one illustrated includes a glass ferrule 26, a splitter chip 28, and a fiber array 30. The fiber array 30 allows for multiple optical fibers 14 to emerge from the fiber optic splitter package 10 either as individual fibers or as a group, bundle, or fiber optic ribbon.

Figure 4:
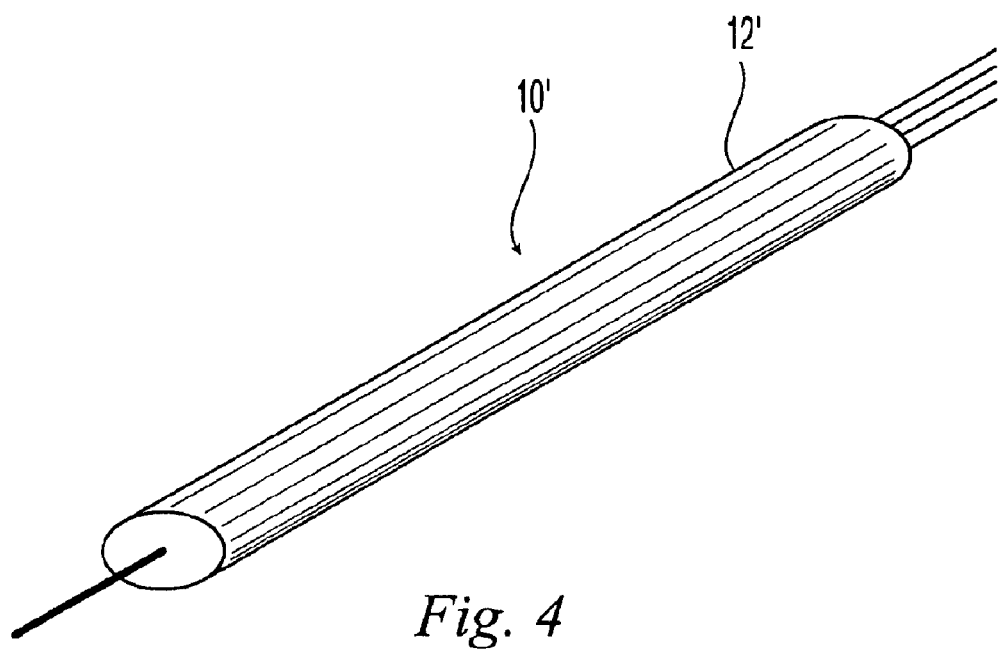
FIG. 4 illustrates an alternative embodiment of a fiber optic splitter package according to a second embodiment of the present invention.
Figure 5:
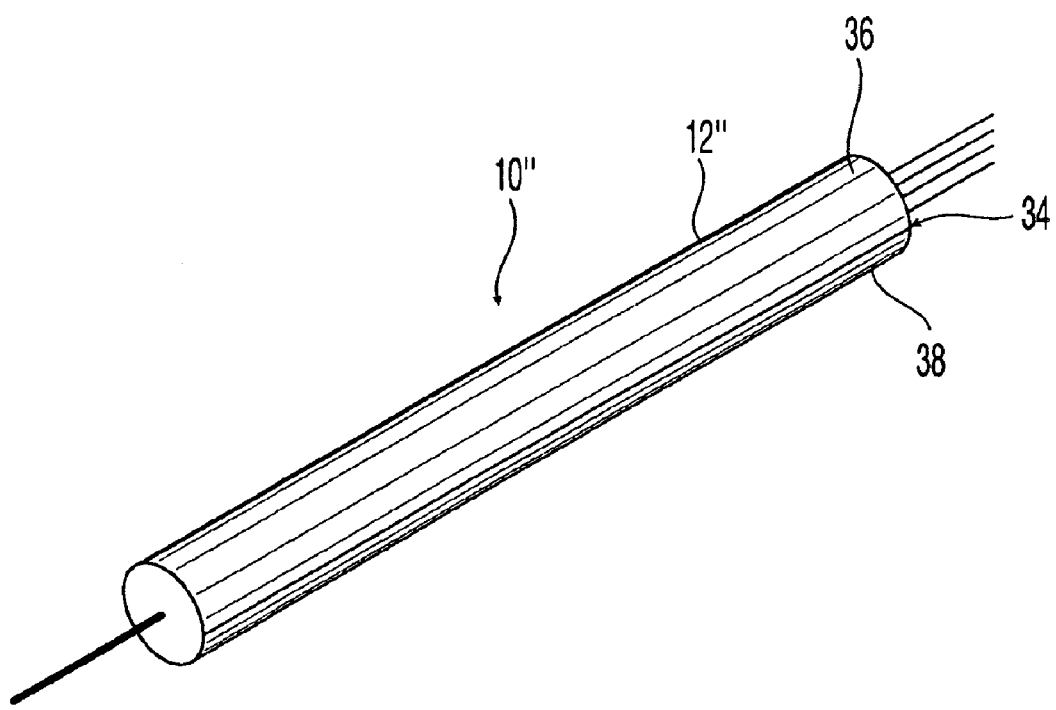
FIG. 5 illustrates an alternative embodiment of a fiber optic splitter package according to a third embodiment of the present invention.

The housing 12 is preferably a rigid substance, for example, stainless steel, to allow for the protection of the fiber optic splitter 22. However, the housing 12 may be made of any appropriate material that provides mechanical protection, including plastics, other appropriate metals, and the like. Preferably the housing 12 has a generally rectangular cross section as shown in FIGS. 1–3. Since the fiber optic splitter 22 generally has a rectangular cross section, a similar shape for the housing 12 provides the smallest housing while providing the best protection for the fiber optic splitter. The embodiment of generally rectangular housing 12 preferably has rounded corners 32. As shown in FIGS. 4 and 5, the housing may also have different configurations. In FIG. 4, the housing 12' for fiber optic splitter package 10' has an oval cross section and in FIG. 5, the housing 12" for the fiber optic splitter package 10" has a circular cross section. Other appropriate configurations for the housing are also within the scope of the present invention. As illustrated in FIG. 5, the housing 10, 10', 10" may also be divided along seam 34 into two portions, a top portion 36 and a bottom portion 38. While the housing 12" is illustrated as being divided into two equal halves in FIG. 5, the top portion 36 and the bottom portion 38 may be divided along any appropriate line.

The flexible retainer member 24 is used to hold the fiber optic splitter 22 within the housing 12, preferably in a way that avoids contact of the splitter 22 with housing 12. The flexible retainer member 24 also provides cushioning for the fiber optic splitter 22 from impact and vibrations that may be applied to the fiber optic splitter package 10. The flexible retainer member 24 is preferably a flexible substance having a modulus of elasticity, yet firmly holds the splitter in the housing. The flexible material can be, for example, a silicone potting compound with suitable properties, as explained herein in connection with the present invention. Flexible retaining member 24 functions as a stress buffer zone between the housing 12 and fiber optic splitter 22. Stresses on the optical fibers 14, 18 and the fiber optic splitter 22 that may develop from sources of stress, for example, due to the different coefficients of thermal expansion of the different materials in the assembly during temperature cycling, are avoided or minimized. Therefore, in one embodiment of the present invention, stress compensating S-bends are not required to be formed in any of the optical fibers associated with the splitter package 10. Since the fiber optic splitter 22 is mostly encased by the flexible retainer member and preferably does not touch or adhere to the housing 12, the flexible retainer member 24 absorbs and compensates for the small changes in any dimensions of the housing 12, including for example, length and diameter, as well as impact and vibration.

While a silicone potting compound is a preferred material for flexible retainer member 24, the present invention includes any appropriate flexible compound with a modulus having a hardness measured on a Shore A scale between 30 and about 80 (or a complex modulus between $10^4$ and $10^9$ dynes/$cm^2$ at a dynamic test frequency of 1 radian/second). A suitable compound with a modulus having a Shore A scale of hardness of between about 45 and about 60 is more preferred and provides even more surprising results, and a compound with a modulus of about 50 on the same scale is most preferred and provides surprising results. The flexible retainer material 24 preferably has a chemical composition that does not damage the fiber coating and the adhesives that are used in the fiber optic splitter 22. However, the flexible retainer material 24 may be of chemical compositions other than silicone, such as polyurethanes of a special composition that do not chemically degrade the components used with the fiber optic splitter package 10.

Figure 6:
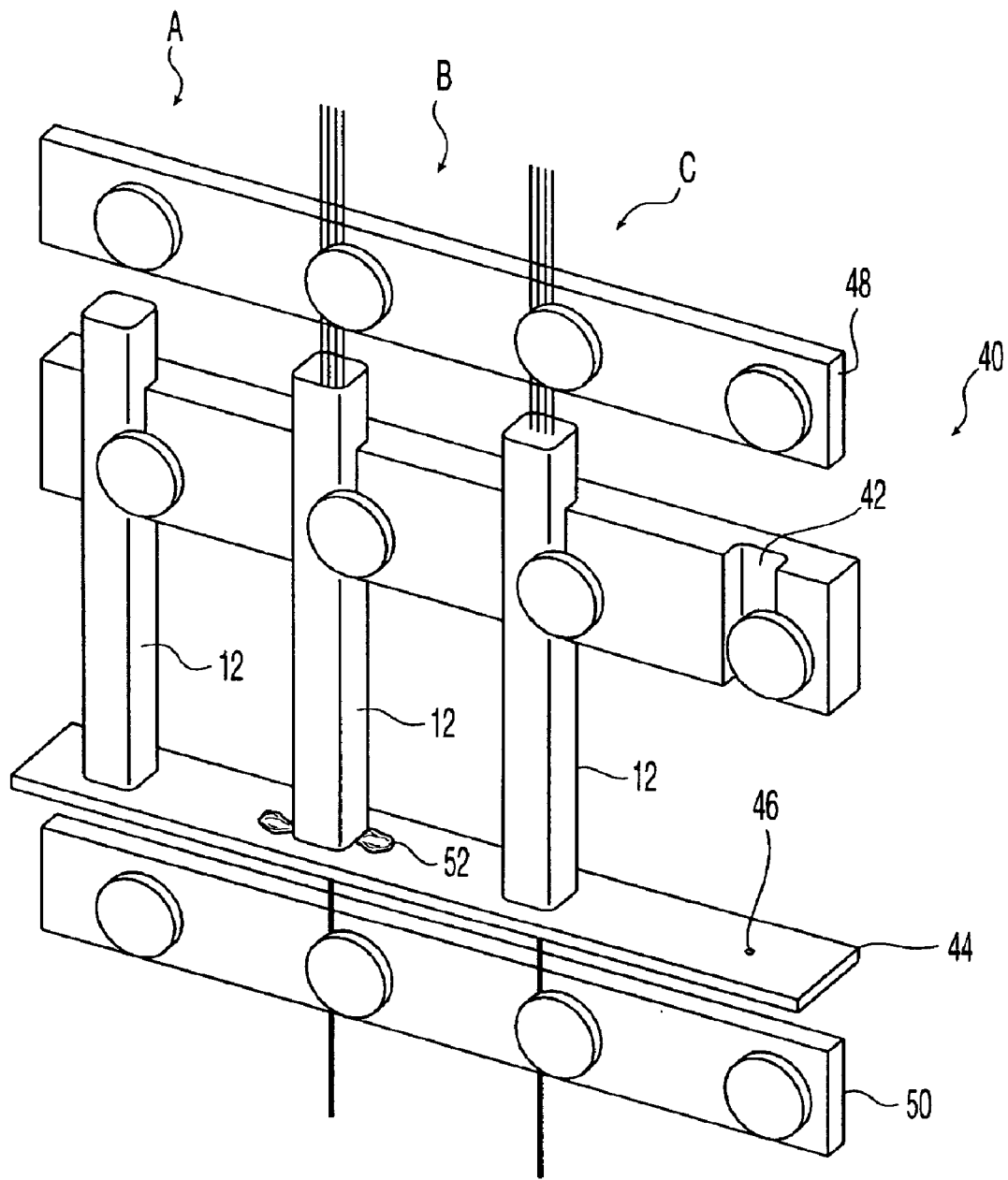
FIG. 6 is a perspective view of one embodiment of a holder according to the present invention with several fiber optic splitter packages mounted therein.

One method to manufacture the fiber optic splitter package will now be described with reference to FIG. 6. Preferably a holder 40 is provided that has cutouts 42 that generally correspond to the shape of the housing 12. The holder 40 is preferably magnetic to hold a metallic housing. If the housing is made of something other than metal, then the holder 40 can hold the housing in any appropriate manner, including clips, screws, brackets, etc. The housing 12 is mounted to the holder 40 with one end adjacent a blocking member 44. The blocking member 44 has a hole 46 to allow the optical fiber 18 or the plurality of optical fibers or a fiber ribbon 14 to extend through the blocking member 44, but blocks the open ends 16, 20 of the housing 12. The holder 40 may also have fiber holders 48, 50 to hold the optical fibers exiting from the fiber optic splitter package 10.

The housing 12 is inserted into the holder 40, as shown in position A on the left side of the figure. The housing is appropriately secured therein as noted above. The fiber optic splitter 22 (not visible) is then inserted into the housing 12 with the optical fibers appropriately fastened to the holder 40 using fiber holders 48,50 as illustrated in position B. The fiber holders 48, 50 are preferably arranged relative to the holder 40 with the fiber optic splitter 22 positioned within the housing 12 such that it does not touch any of the sides of the housing 12. A small amount of the flexible retainer member 24 is then preferably introduced into the housing 12 in a liquid form. The small amount of the flexible retainer member 24 is then quickly cured using an appropriate method. Typically a hot air gun is used to cure the small amount of the flexible retainer member 24 and create a membrane or cover on the lower end of the housing 12. A small amount 52 of the flexible retainer member 24 may leak out between the housing and the blocking member 44. After the membrane or cover is created, the remainder of the flexible retainer member 24 can then be introduced into the housing 12 (see position C). The remainder of the flexible retainer member 24 should be introduced at an appropriate rate and volume to avoid bubbles, voids or under filling the housing 12. It is preferred that flexible member 24 fully encases the splitter package in the housing, however, it is only necessary that the flexible member 24 contacts the splitter 22 to the degree required to adequately support the splitter and assure the overall optical performance characteristics of fiber optic splitter package 10. The fiber optic splitter package 10 may then be allowed to sit while the flexible retainer member 24 cures, or it may be moved into an appropriate location to cure, such as an oven, depending on the nature of the flexible retainer member 24. In a preferred embodiment, because the flexible material of the retainer member 24 accommodates stress acting on the assembly, the splitter package 10 does not require an S-bend formed in any of the optical fibers. Furthermore, end caps or plugs placed into any end of the housing 12 may be included, but such are not required by the present invention.

It will be apparent to those skilled in the art that various modifications and variations can be made in the fiber optic splitter package of the present invention without departing from the spirit or scope of the invention. Thus, it is intended that the present invention cover the modifications and variations of this invention that are within the scope of the appended claims and their equivalents. For example, the present inventions may include contact between the splitter and the housing, and/or one or more S-bends, if necessary.

We claim:

1. A fiber optic splitter package comprising:
    a housing;
    a fiber splitter assembly disposed within the housing; and
    a flexible retainer member contacting and retaining at least a portion of the fiber splitter assembly within the housing, said flexible retainer member having a modulus of about 30 to about 80 measured on the Shore A hardness scale.

2. The fiber optic splitter package of claim 1, wherein the housing has a passageway and the fiber splitter assembly is disposed within the passageway of the housing.

3. The fiber optic splitter package of claim 1, wherein the flexible retainer member comprises silicone.

4. The fiber optic splitter package of claim 1, wherein the housing is generally oval in cross section.

5. The fiber optic splitter package of claim 1, wherein the housing is generally rectangular in cross section.

6. The fiber optic splitter package of claim 1, wherein the housing is generally is circular in cross section.

7. The fiber optic splitter package of claim 1, wherein the housing has a top portion and a bottom portion.

8. The fiber optic splitter package of claim 1, wherein the flexible retainer member prevents the fiber splitter assembly from contacting the housing.

9. The fiber optic splitter package of claim 1, wherein the housing is made from stainless steel.

10. A method for retaining a fiber splitter assembly within a housing comprising:
    disposing the housing in a holder;

inserting the fiber splitter assembly into the housing; and introducing a flexible retainer member into the housing and around the fiber splitter assembly, the flexible retaining member substantially contacting at least a portion of the fiber splitter assembly, and said flexible retainer member having a modulus of about 30 to about 80 measured on the Shore A hardness scale.

11. The method for retaining a fiber splitter assembly of claim 10, wherein the flexible retainer member is introduced as a fluid.

12. The method for retaining a fiber splitter assembly of claim 11, further comprising the step of curing at least a portion of the liquid flexible retainer member prior to introducing the remaining portion of the liquid flexible retainer member.

13. The method for retaining a fiber splitter assembly of claim 12, further comprising the step of curing the remaining portion of the liquid flexible retainer member.

14. The method for retaining a fiber splitter assembly of claim 10, wherein the step of inserting the fiber splitter assembly includes holding the fiber splitter assembly relative to the housing such that the fiber splitter assembly does not contact the housing before and after the introduction of the flexible retainer member.

15. The method of retaining a fiber splitter assembly of claim 10, wherein the holder holds the housing with at least one magnet.

16. A fiber optic splitter package having a housing, said fiber optic splitter package comprising:

a fiber splitter assembly inserted into a passageway in said housing without contacting the housing; and a resilient retainer member formed around the fiber splitter assembly contacting at least a portion of the fiber splitter assembly and defining at least a partial buffer zone between the housing and the fiber splitter assembly within the housing, said flexible retainer member having a modulus of about 30 to about 80 measured on the Shore A hardness scale.

17. The fiber optic splitter package of claim 16, wherein the fiber splitter assembly includes optical fibers extending therefrom, and wherein said optical fibers do not include an S-bend formed therein.

18. The fiber optic splitter package of claim 17, wherein the fiber splitter assembly includes a plurality of optical fibers extending from a first end thereof and a single optical fiber extending from a second and thereof opposite the first end.

* * * * *